July 24, 1928.
J. H. BROPHY
1,678,178
EXTERMINATING DEVICE FOR RATS, SQUIRRELS, AND OTHER PESTS
Filed June 25, 1927    2 Sheets-Sheet 1
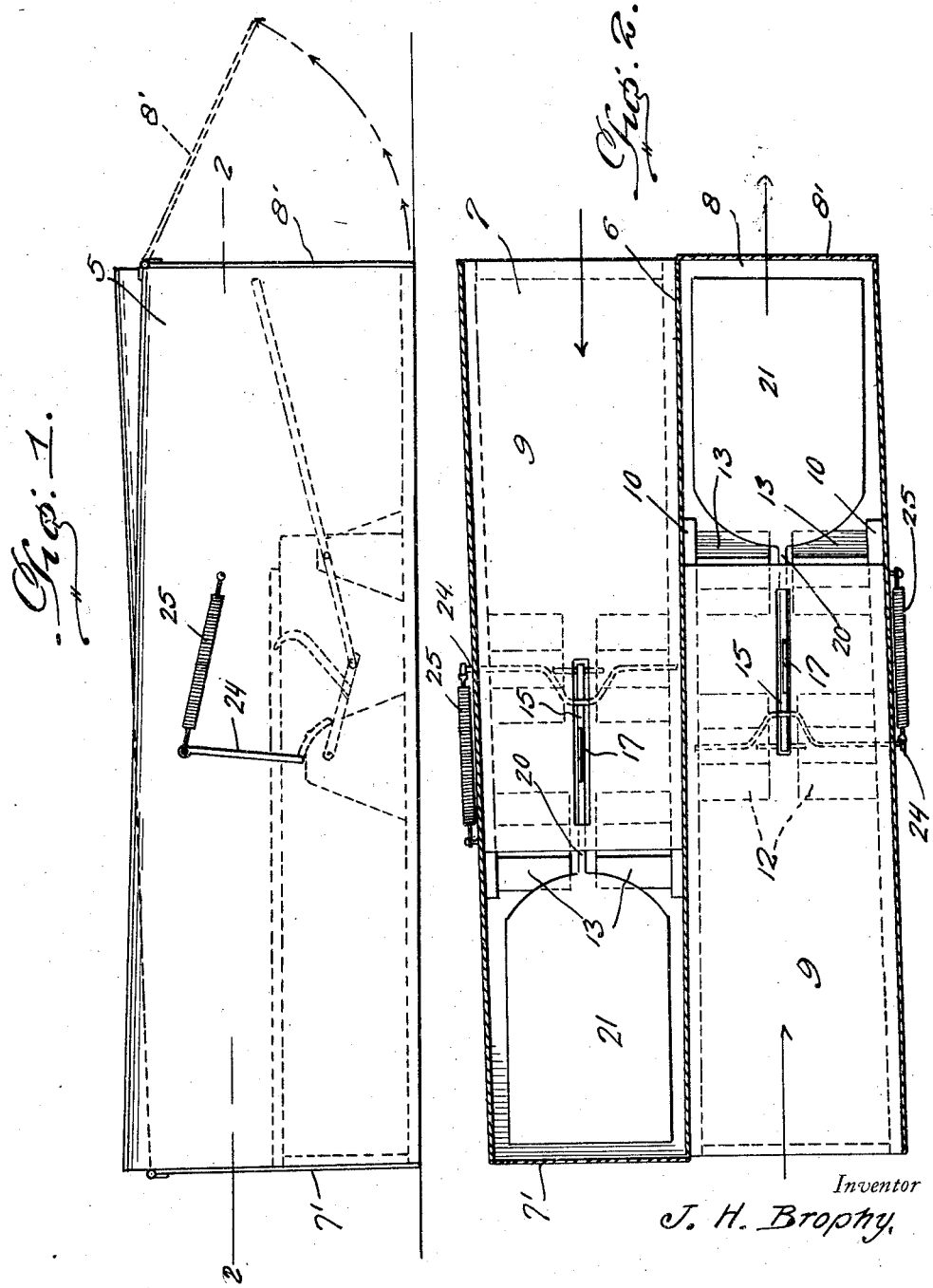
Inventor
J. H. Brophy,
By Clarence A. O'Brien
Attorney

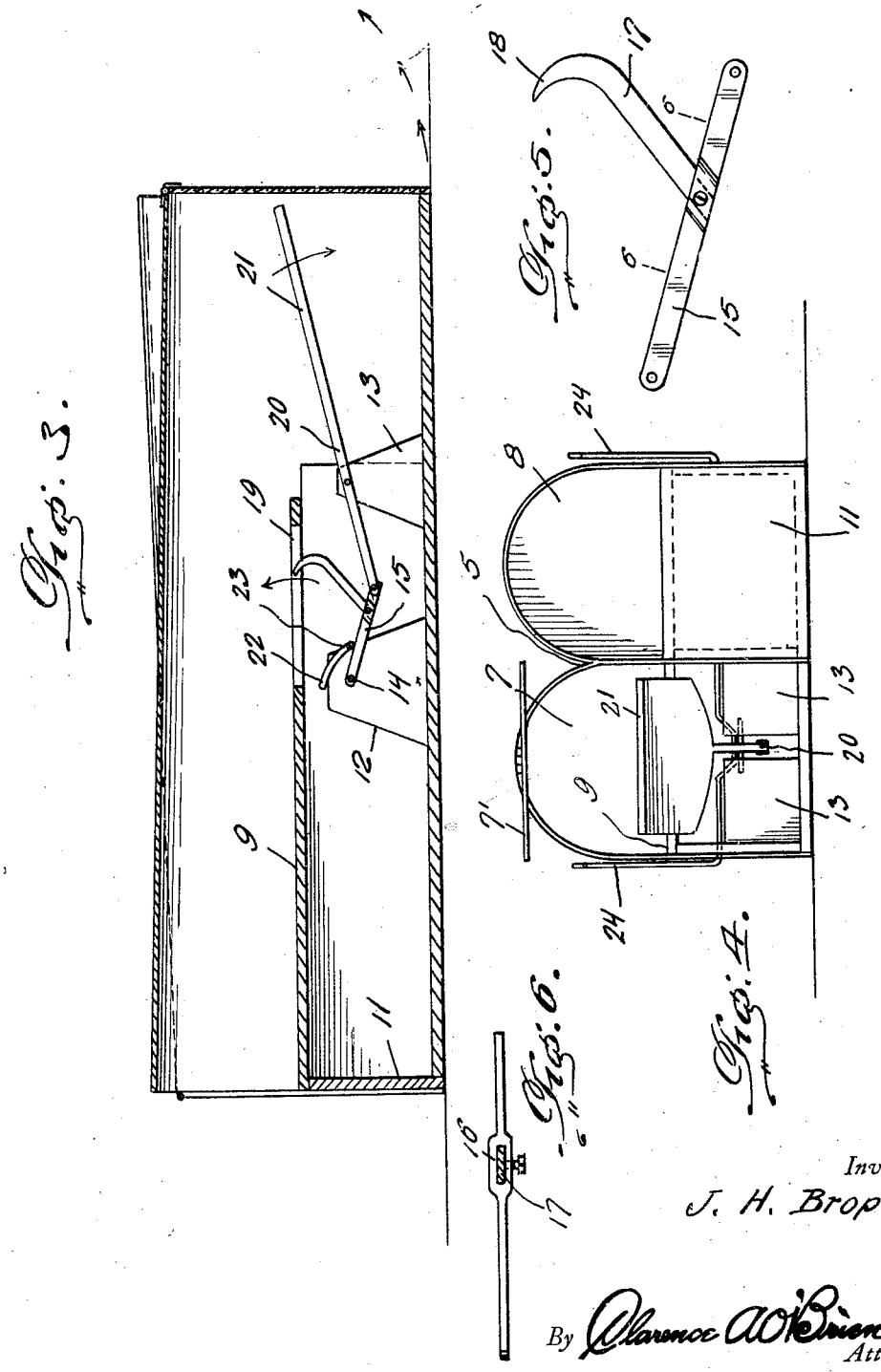

Patented July 24, 1928.

1,678,178

UNITED STATES PATENT OFFICE.

JAMES H. BROPHY, OF DEER PARK, WASHINGTON, ASSIGNOR OF ONE-HALF TO VINCENT C. EMERICK, OF LOCKE, WASHINGTON.

EXTERMINATING DEVICE FOR RATS, SQUIRRELS, AND OTHER PESTS.

Application filed June 25, 1927. Serial No. 201,523.

This invention relates generally to animal trapping devices and has particular reference to a device wherein squirrels, rats, or other pests are exterminated the device generally consisting of a housing through which the animals are to pass, means being located within the housing and operable by the animal passing therethrough, to cause the projection of a knife through the stomach and then into the vital parts of the animal's entrails in the extermination thereof.

In the drawing:—

Figure 1 is a side elevation of the improved device.

Fig. 2 is a horizontal section thereof, from the line 2—2 of Fig. 1.

Fig. 3 is a longitudinal section through one compartment of the device.

Fig. 4 is an end elevation thereof.

Fig. 5 is a side elevation of one of the blade units of the invention, and

Fig. 6 is an enlarged detail view of the unit taken substantially upon the line 6—6 of Fig. 5.

Now having particular reference to the drawings, my novel trap consists of a housing 5 of sheet metal or the like, provided centrally with a division wall 6 throughout its length, for dividing the housing into a pair of runways 7 and 8. The top walls of these runways are preferably rounded while the runways of gradually tapering formation in reverse directions are substantially indicated in Fig. 2. The mechanism within each runway is of identical construction only located at opposite sides of the centers thereof and at reverse positions to each other.

Furthermore, the large end of each runway is open while the smaller ends thereof are provided with hinged doors 7' and 8', said doors being hinged at their upper edges to the top walls of the runways, see Fig. 1. These doors are of dark opaque glass or other non-transparent material and are so hinged as to permit the same to be swung in outward direction but to prevent the swinging movement of the same into the runway by reason of the lower edges contacting the floor boards of the runway, which boards are preferably of wood.

Located in each runway and terminating at the larger end thereof, is a platform 9 supported at its edges by side boards 10—10 and at its outer end by a vertical board 11 which acts as a closure for the end of the runway beneath said platform 9. Located beneath the forward end of each platform 9 are transversely spaced standards 12—12 and 13—13. Pivoted between each innermost pair of standards 12 as at 14, is a forwardly extending knife blade carrying lever 15, formed adjacent its forward end with a diagonally extending enlargement through which is a diagonal slot 16. Detachably secured within said slot 16 is an upwardly and forwardly extending blade 17 the upper end thereof, being bent reversely into hook formation 18.

The platform 9 between the pairs of standards, is formed with a longitudinal slot 19, through which the blade 17 is adapted to extend in the direction of the arrow in Fig. 3 in a manner hereinafter more fully described, the end of the blade being normally beneath the surface of the platform, so that the same will not be in sight of the animal moving through the runway.

Pivoted between the outermost pair of standards 13—13 of each runway, is the narrow crank 20, of a trip platform 21, the inner end of the shank being pivotally secured to the forward end of the knife blade carrying lever 15 as clearly indicated in Fig. 3.

Extending above the rearmost standards 12—12 in each runway and journaled in the platform supporting walls 10—10 and extending through the outer side wall of the respective runway, is a rock shaft 22 formed at a point between the standards with a downwardly extending crank 23 for rest upon the knife blade carrying lever 15.

The outer end of each shaft is bent upwardly to provide an arm 24 which arm is connected to the side wall of the respective runway by a retractile coil spring 25 for the purpose of so actuating the rock shaft as to maintain the crank 23 in permanent engagement with the respective lever 15, so that the blade 17 will be in a downward position, while the trip platform 21 will be raised.

Obviously, as the animals pass into either runway in the direction of the arrows 2, they will in stepping from the platform rest upon the trip platform 21 causing the downward movement of the same in the direction of the arrow in Fig. 3, and the raising of the blade 17, causing the pointed rearwardly bent end thereof to cut into the stomach resulting in their extermination.

The purpose of the opaque hinged doors

7' and 8' are to permit access to the interior of the runways, at the same time causing the darkening of the interior thereof, leading the animals to believe they are entering a hole. The purpose of the double runway is to cause the animals passing in reverse directions to enter the respective runway.

In view of the foregoing description when considered in conjunction with the accompanying drawings, the specific construction as well as the detail operation of the device will be readily appreciated by those skilled in the art, and even though I have herein shown and described the invention, as consisting of certain detail structural elements, it is nevertheless to be understood that some changes may be made therein without departing from the spirit and scope of the appended claims.

Having thus described my invention, what I claim as new is:—

1. In an animal exterminating device of the character described, a housing open at one end to permit the animal to enter therein, a platform within the housing upon which the animal is to walk, a knife normally disposed beneath the platform, and a trip platform at the end of the first-mentioned platform operatively associated with said knife to cause the upward movement of the body of the animal, when the trip platform is depressed.

2. In an animal exterminating device of the character described, a housing open at one end to permit the animal to enter therein, a platform mounted within the housing upon which the animal is to walk, a knife pivoted beneath the platform adjacent its inner end, movable vertically through a slot within the platform, and means in the end of the platform to cause the movement of the knife into the body of the animal when said animal steps with his front feet upon said platform.

3. In an animal exterminating device of the character described, a housing adapted to provide a pair of runways opposite ends of said runways being open to permit the animal to pass therein in reverse directions, a horizontal platform within each runway terminating at its outer end at the open end of the runway and at its inner end in spaced relation with the opposite end of the runway, a knife pivoted beneath each platform and adapted to be moved upwardly through a longitudinal slot within the platform, and a trip platform pivoted beneath the end of the first mentioned platform and operatively associated with the respective knife adapted to cause the upward movement of the same into the animal's body, as such animal steps with his front feet upon said trip platform.

In testimony whereof I affix my signature.

JAMES H. BROPHY.